United States Patent
Otake et al.

(10) Patent No.: US 6,246,934 B1
(45) Date of Patent: Jun. 12, 2001

(54) VEHICULAR DATA RECORDING APPARATUS AND METHOD

(75) Inventors: Hirotada Otake, Susono; Shigeyuki Kido, Gotenba, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/573,254

(22) Filed: May 18, 2000

(30) Foreign Application Priority Data

May 28, 1999 (JP) .................................................. 11-150077

(51) Int. Cl.$^7$ ........................... B60R 27/00; G06F 15/74; G06F 15/20
(52) U.S. Cl. ................................... 701/35; 701/1; 701/36; 340/52 F; 340/439; 303/103; 303/100; 188/349
(58) Field of Search .......................... 701/35; 364/424.03; 303/9.71; 180/248, 197; 280/707

(56) References Cited

U.S. PATENT DOCUMENTS

| | | | |
|---|---|---|---|
| 5,103,397 | * | 4/1992 | Ikemoto et al. ................. 364/424.05 |
| 5,212,640 | * | 5/1993 | Matsuda ........................... 364/424.03 |
| 5,282,674 | * | 2/1994 | Matsuda .............................. 303/9.71 |
| 5,446,658 | * | 8/1995 | Pastor et al. ..................... 364/424.01 |
| 5,927,425 | * | 7/1999 | Kusano .............................. 180/248 |
| 6,067,488 | * | 5/2000 | Tano ..................................... 701/35 |

FOREIGN PATENT DOCUMENTS

| | | |
|---|---|---|
| 5-150314 | 6/1993 | (JP) . |
| 7-249137 | 9/1995 | (JP) . |
| 7-277230 | 10/1995 | (JP) . |

\* cited by examiner

Primary Examiner—William A. Cuchlinski, Jr.
Assistant Examiner—Tuan C To
(74) Attorney, Agent, or Firm—Oliff & Berridge PLC

(57) ABSTRACT

A vehicular data recording apparatus records running data regarding a vehicle into a memory in an overwrite manner when the running data needs to be recorded. If the vehicle enters an abnormal state, such as a crash or the like, the apparatus prevents the recording, and retains the running data recorded up to that moment in the memory. The apparatus determines whether the vehicle is in the abnormal state, for example, on the basis of a determination as to whether the vehicle has entered a stopped state within a predetermined time Tc following a time point at which the absolute value of a longitudinal acceleration Gx of the vehicle becomes equal to or greater than a reference value Gx1 and/or a time point at which the absolute value of a lateral acceleration Gy becomes equal to or greater than a reference value Gy1. Alternatively, or in addition, the vehicle is determined to be in an abnormal state based on a determination as to whether the vehicle is in the stopped state and the absolute value of the longitudinal acceleration Gx is equal to or greater than a reference value Gx2, and/or the absolute value of the lateral acceleration Gy is equal to or greater than a reference value Gy2.

23 Claims, 4 Drawing Sheets

| | M1 | M2 | M3 |
|---|---|---|---|
| S1 | ID No. | ID No. | ID No. |
| S2 | WHEEL SPEED Vfr | WHEEL SPEED Vfr | WHEEL SPEED Vfr |
| | WHEEL SPEED Vfl | WHEEL SPEED Vfl | WHEEL SPEED Vfl |
| | WHEEL SPEED Vfr | WHEEL SPEED Vfr | WHEEL SPEED Vfr |
| | WHEEL SPEED Vfl | WHEEL SPEED Vfl | WHEEL SPEED Vfl |
| | LONGITUDINAL ACCELERATION Gx | LONGITUDINAL ACCELERATION Gx | LONGITUDINAL ACCELERATION Gx |
| | LATERAL ACCELERATION Gy | LATERAL ACCELERATION Gy | LATERAL ACCELERATION Gy |
| | STEERING ANGLE θ | STEERING ANGLE θ | STEERING ANGLE θ |
| | SLIP RATE Rsfr | SLIP RATE Rsfr | SLIP RATE Rsfr |
| | SLIP RATE Rsfl | SLIP RATE Rsfl | SLIP RATE Rsfl |
| | SLIP RATE Rsfr | SLIP RATE Rsfr | SLIP RATE Rsfr |
| | SLIP RATE Rsfl | SLIP RATE Rsfl | SLIP RATE Rsfl |
| S3 | DETERMINATION RESULT | DETERMINATION RESULT | DETERMINATION RESULT |

VEHICULAR DATA RECORDING APPARATUS AND METHOD

INCORPORATION BY REFERENCE

The disclosure of Japanese Patent Application No. HEI 11-150077 filed on May 28, 1999 including the specification, drawings and abstract is incorporated herein by reference in its entirety.

BACKGROUND OF THE INVENTION

1. Field of the Invention

The invention relates to a vehicular data recording apparatus and method and, more particularly, to a data recording apparatus and method that records running data of a vehicle.

2. Description of the Related Art

A data recording apparatus of a vehicle, such as a motor vehicle or the like, is disclosed in, for example, Japanese Patent Application Laid-Open No. 7-249137. The data recording apparatus records running data (driving data) regarding the vehicle by storing the data into a storage device in a sequential overwrite manner. When the magnitude of acceleration of the vehicle is equal to or greater than a reference value, the apparatus determines that the vehicle has entered an abnormal state, and stops the overwrite storage of data into the storage device.

Since the data recording apparatus records running data of the vehicle into the storage device in the sequential overwrite manner, the storage device of the apparatus does not need to have a large storage capacity. Furthermore, since the data recording apparatus stops the overwrite data storage into the storage device when the magnitude of acceleration of the vehicle becomes equal to or greater than the reference value, the data recording apparatus is able to reliably store running data provided immediately before the magnitude of vehicle acceleration becomes equal to or greater than the reference value.

However, since the data recording apparatus is constructed so as to determine that the vehicle has entered an abnormal state when the magnitude of vehicle acceleration becomes equal to or greater than the reference value, the data recording apparatus sometimes fails to detect an abnormal state although the vehicle is actually in an abnormal state. More specifically, the acceleration of a vehicle becomes relatively great in some cases during normal running of the vehicle. Therefore, in a data recording apparatus that determines whether the vehicle is in an abnormal state on the basis of only the magnitude of acceleration of the vehicle, the reference value for the determination as to whether the vehicle is in an abnormal state needs to be set to a relatively large value. Hence, in some cases, although an abnormal state, such as a crash of the vehicle or the like, has actually occurred, the data recording apparatus fails to detect the abnormal state, and therefore fails to store running data provided immediately before the occurrence of the abnormal state of the vehicle.

SUMMARY OF THE INVENTION

Accordingly, it is an aspect of the invention to reliably determine, when a vehicle enters an abnormal state, that the vehicle is in the abnormal state, so as to store running data provided immediately before the occurrence of the abnormal state of the vehicle.

In accordance with one aspect of the invention, a vehicular data recording apparatus includes a memory that stores running data regarding a vehicle, and a running data recording controller that controls the storage of the running data by the memory. In particular, the running data recording controller: determines whether a magnitude of an acceleration of the vehicle is equal to or greater than a reference value; determines whether a vehicle speed of the vehicle is equal to or less than a reference value; determines whether the vehicle is in an abnormal state based on the determined vehicle acceleration and speed; and controls the storage of the running data into the memory based on whether the abnormal state has been determined.

Normally, when a vehicle crashes, the deceleration of the vehicle sharply increases simultaneously with the crash so that the magnitude of the acceleration reaches a very large value, and the vehicle speed sharply decreases to a very small value. In contrast, when the magnitude of the acceleration becomes relatively great during normal running of the vehicle, the vehicle speed is relatively high. If, due to a crash of a vehicle or the like, the state of the mount of a sensor for detecting the acceleration of the vehicle becomes abnormal or the vehicle becomes abnormally tilted, the sensor comes to constantly indicate a very high value that is normally not reached during normal running or stoppage of the vehicle. Therefore, by taking into consideration the vehicle speed in addition to the acceleration of the vehicle, it becomes possible to more reliably determine whether the vehicle is in an abnormal state such as a crash of the vehicle or the like.

In the above-described vehicular data recording apparatus, it is determined whether the vehicle is in the abnormal state based on the determined vehicle acceleration and speed. Therefore, the e apparatus is able to discriminate the abnormal state from a case where the magnitude of the acceleration of the vehicle becomes relatively great during normal driving or stoppage of the vehicle, and therefore is able to more reliably determine whether the vehicle is in the abnormal state. Hence, the apparatus is able to reliably store running data provided immediately before the vehicle enters the abnormal state.

In the vehicular data recording apparatus, the abnormal state may be determined if the vehicle speed is determined to be equal to or less than the reference speed value within a predetermined length of time following a time point at which the acceleration is determined to be equal to or greater than the reference acceleration value.

Therefore, since it is determined that the vehicle is in the abnormal state if the vehicle speed is determined to be equal to or less than the reference speed value within the predetermined length of time following a time point at which the acceleration is determined to be equal to or greater than the reference acceleration value, it is not necessary to set a large reference value for the determination regarding the acceleration of the vehicle. Thus, the apparatus is able to more reliably determine whether the vehicle is in the abnormal state.

The vehicular data recording apparatus may further have a construction as follows. That is, the acceleration determination may be made by determining whether a magnitude of a longitudinal acceleration of the vehicle is equal to or greater than a corresponding longitudinal acceleration reference value, and whether a magnitude of a lateral acceleration of the vehicle is equal to or greater than a corresponding lateral acceleration reference value. The abnormal state is determined if the vehicle speed is determined to be equal to or less than the reference speed value within the predetermined length of time following one of a time point at which the longitudinal acceleration of the vehicle is determined to be equal to or greater than the longitudinal acceleration reference value and a time point at which the lateral acceleration of the vehicle is determined to be equal to or greater than the lateral acceleration reference value.

The abnormal state may be determined if the vehicle speed is determined to be equal to or less than the reference speed value and the acceleration is determined to be equal to or greater than the reference acceleration value.

Therefore, since it is determined that the vehicle is in the abnormal state if the vehicle speed is determined to be equal to or less than the reference speed value and the acceleration is determined to be equal to or greater than the reference acceleration value, it is not necessary to set a large reference value for the determination regarding the acceleration of the vehicle. Thus, the apparatus is able to more reliably determine whether the vehicle is in the abnormal state.

The vehicular data recording apparatus may further have a construction in which the acceleration determination is made by determining whether a magnitude of a longitudinal acceleration of the vehicle is equal to or greater than a corresponding reference longitudinal acceleration value, and whether a magnitude of a lateral acceleration of the vehicle is equal to or greater than a corresponding reference lateral acceleration value. The abnormal state is determined by determining that the vehicle is in the abnormal state if the vehicle speed is determined to be equal to or less than the reference speed value and the magnitude of the longitudinal acceleration of the vehicle is determined to be equal to or greater than the corresponding reference lateral acceleration value, or if the vehicle speed is determined to be equal to or less than the reference speed value and the magnitude of the lateral acceleration of the vehicle is determined to be equal to or greater than the corresponding reference lateral acceleration value.

Furthermore, the vehicle speed may be determined to be equal to or less than the reference speed value when the vehicle speed is substantially zero. Therefore, since it is determined that the vehicle speed is equal to or less than the reference speed value when the vehicle speed is substantially zero, the apparatus reliably prevents an abnormal state from being determined when the acceleration of the vehicle becomes relatively large during normal running, which would be undesirable.

The vehicular data recording apparatus may further have a construction as follows. That is, the running data regarding the vehicle is written into the memory in an overwrite manner. The controller prevents the running data previously stored in the memory from being overwritten if the vehicle is determined to be in the abnormal state.

Therefore, when the vehicle is determined to be in the abnormal state, the overwriting of running data in the memory is prevented. Hence, the vehicular data recording apparatus more reliably prevents an undesired event that data provided after the vehicle enters the abnormal state is written into the memory in the overwrite manner, that is, an undesired event that the running data stored immediately before the vehicle enters the abnormal state is erased.

The memory may include a plurality of storage areas, and may be designed so that the running data is written into a storage area that stores oldest running data in the overwrite manner.

The controller can determine whether the running data regarding the vehicle is to be recorded, a memory for storing the running data, and a device for writing the running data into the memory when the controller determines that the running data is to be recorded.

Furthermore, the controller may determine whether the running data is to be recorded, at predetermined time intervals.

Still further, the vehicle may have a motion control apparatus that performs a motion control for stabilizing a motion of the vehicle during driving, and the controller may determine that the running data is to be recorded when the motion control apparatus is performing the motion control.

Further, the apparatus may include a device for detecting a lateral acceleration of the vehicle, and the controller may determine that the running data is to be recorded if a magnitude of the lateral acceleration of the vehicle is equal to or greater than a reference value.

BRIEF DESCRIPTION OF THE DRAWINGS

The foregoing and further objects, features and advantages of the invention will become apparent from the following description of a preferred embodiment with reference to the accompanying drawings, wherein like numerals are used to represent like elements and wherein.

DETAILED DESCRIPTION OF PREFERRED EMBODIMENT

A preferred embodiment of the invention will be described hereinafter with reference to the accompanying drawings.

Figure 1:
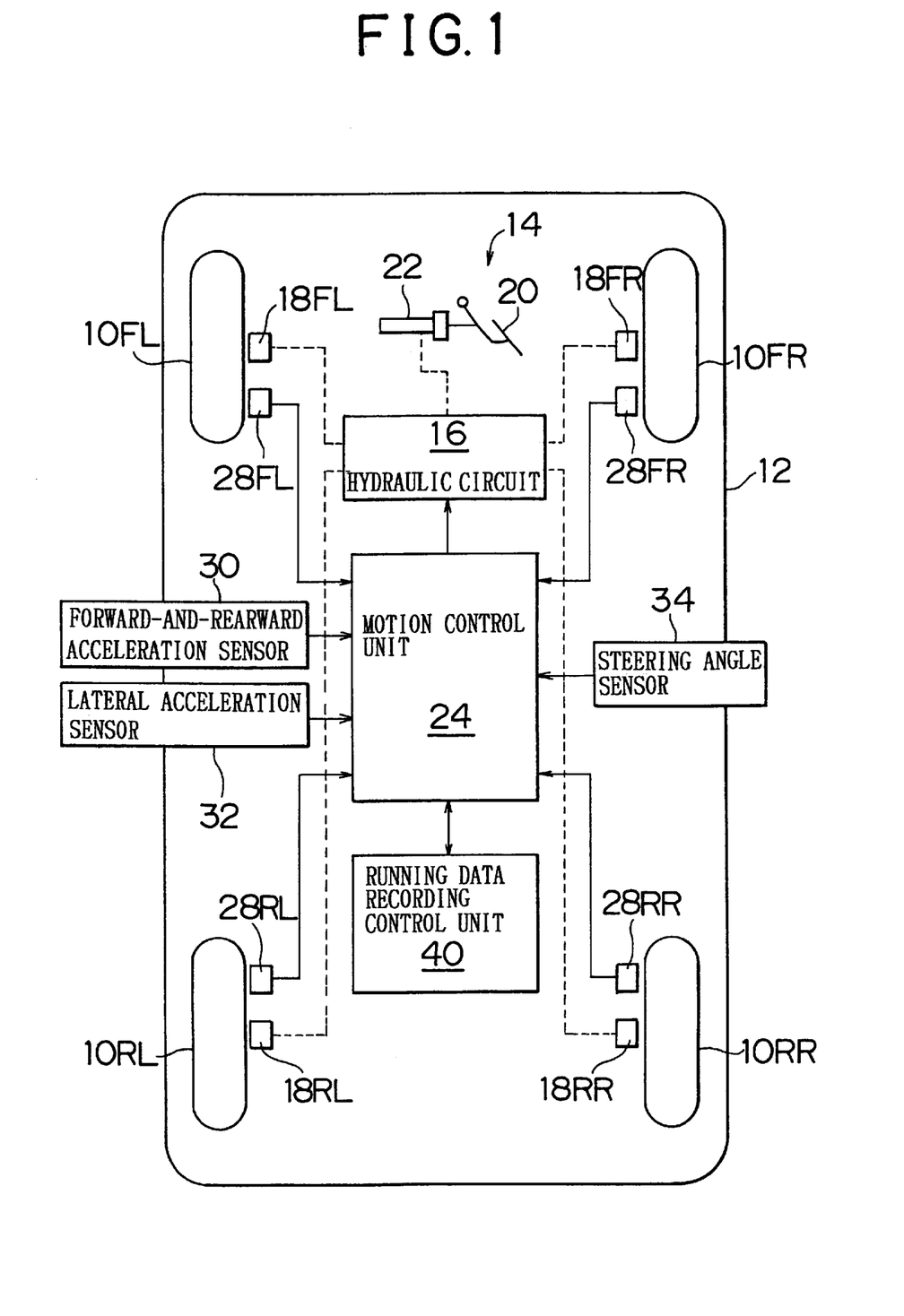
FIG. 1 is a schematic illustration of a construction of a running data recording apparatus for a vehicle according to a preferred embodiment of the invention, applied to a vehicle equipped with a motion control apparatus.
Figure 2:
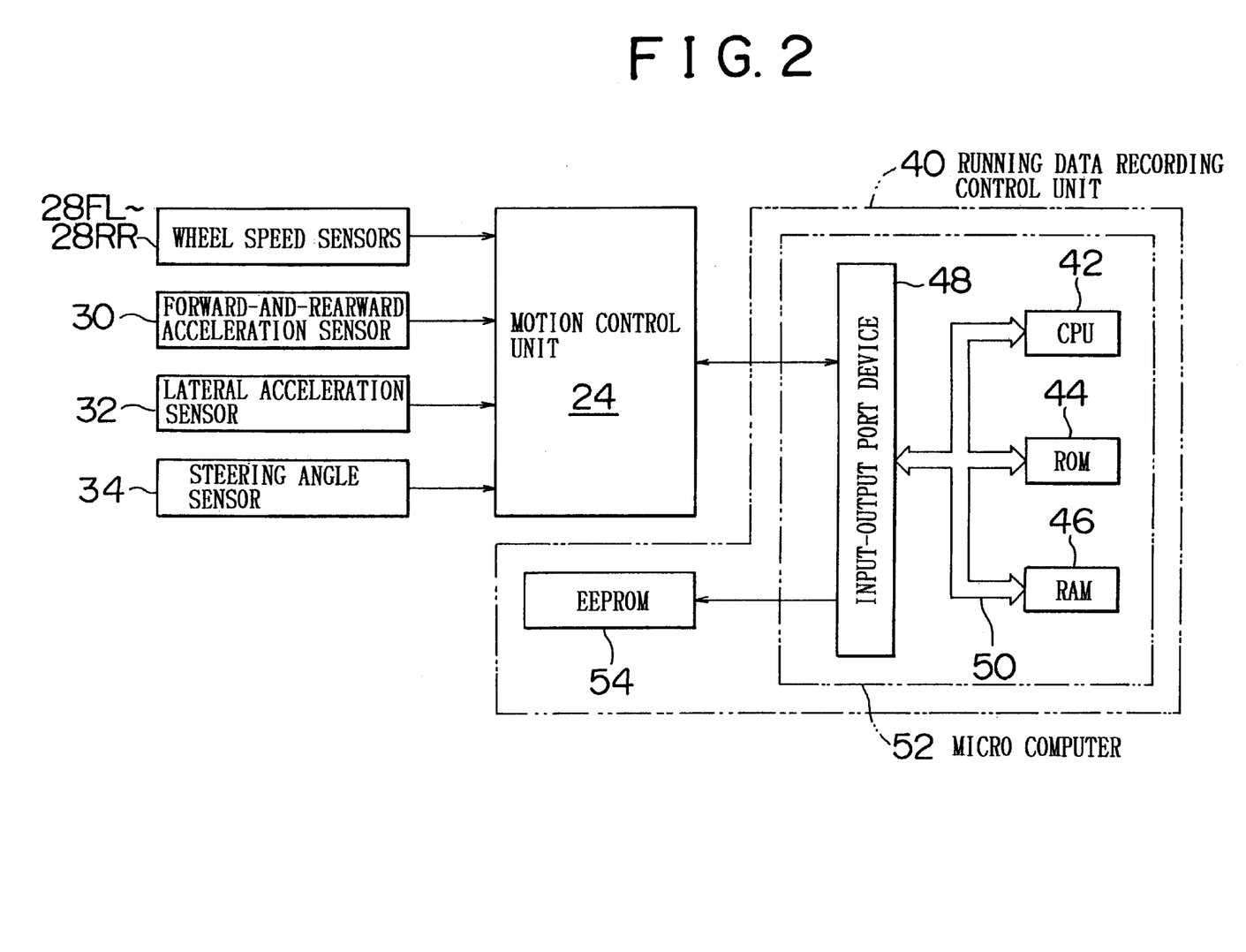
FIG. 2 is a block diagram of the running data recording apparatus shown in FIG. 1.

FIG. 1 is a schematic illustration of a construction of a running data recording apparatus for a vehicle according to a preferred embodiment of the invention, applied to a vehicle equipped with a motion control apparatus. FIG. 2 is a block diagram of the running data recording apparatus shown in FIG. 1.

Referring to FIG. 1, the braking forces on right and left-side front wheels 10FR, 10FL and right and left-side rear wheels 10RR, 10RL are controlled by a hydraulic circuit 16 of a brake apparatus 14 that controls the braking pressures of wheel cylinders 18FR, 18FL, 18RR, 18RL. Although not shown in FIG. 1, the hydraulic circuit 16 includes an oil reservoir, an oil pump, and various valve devices. During a normal operation, the braking pressure of each wheel cylinder is controlled in accordance with the pressure in a master cylinder 22 that is driven in response to depression of a brake pedal 20 performed by a driver of the vehicle.

Wheel speed sensors 28FR, 28FL, 28RR, 28RL are provided near the wheels 10FR, 10FL, 10RR, 10RL, respectively, for detecting the wheel speeds Vi (i=fr, fl, rr, rl) of the corresponding wheels. A vehicle 12 is further equipped with a forward-and-rearward acceleration sensor 30 for detecting the longitudinal acceleration of a vehicle body, a lateral acceleration sensor 32 for detecting the lateral acceleration of the vehicle body, and a steering angle sensor 34 for detecting the steering angle θ. A signal from each sensor indicating the value detected thereby is input to a motion control unit 24 and, via the motion control unit 24, is input into a running data recording control unit (controller) 40.

The motion control unit 24 calculates braking slip rates Rs of the wheels based on the wheel speeds Vi detected by the wheel speed sensors 28FR–28RL. When the braking slip rate Rs of a wheel becomes equal to or greater than a reference value Rso (positive constant value), the motion control unit 24 starts an anti-skid control of increasing or decreasing the braking forces on the wheels so that the braking slip rate Rs of that wheel changes into a predetermined range. The motion control unit 24 ends the anti-skid control when a pre-set ending condition is satisfied.

Thus, the motion control unit 24 forms a motion control apparatus that, when there is a danger that the running motion of the vehicle will become unstable due to an excessive braking slip of a wheel, improves the stability of the vehicle during running by normalizing the braking slip of that wheel through cooperation with the brake apparatus 14. However, the motion control unit 24 does not perform the motion control (anti-skid control) if it receives a signal for preventing the vehicle motion control from the running data recording control unit 40.

The anti-skid control, that is, a motion control performed by the motion control unit 24, may be performed in any manner known in the art. The motion control unit 24 may be designed so as to perform various motion controls, such as, for example, a traction control through a braking force control, a behavior stabilizing control, and the like, in addition to the anti-skid control.

As shown in FIG. 2, the running data recording control unit 40 includes, for example, a general purpose microcomputer 52 having a CPU 42, a ROM 44, a RAM 46, and an input-output port device 48 that are interconnected by a bidirectional common bus 50, and an EEPROM 54, that is, a non-volatile external memory, as an external storage device.

The running data recording control unit 40 periodically determines whether quantities of states detected by the various sensors, that is, running data (driving data) of the vehicle, are to be recorded, on the basis of the lateral acceleration Gy or the information from the motion control unit 24, as described below. When the running data recording control unit 40 determines that running data needs to be recorded, the running data recording control unit 40 records the running data into the EEPROM 54.

Furthermore, the running data recording control unit 40 determines whether the vehicle has entered an abnormal state on the basis of the wheel speeds Vi, the longitudinal acceleration Gx, and the lateral acceleration Gy. When it is determined that the vehicle has not entered an abnormal state, the running data recording control unit 40 allows running data to be recorded. When it is determined that the vehicle has entered the abnormal state, the running data recording control unit 40 prevents further running data from being recorded in the overwrite manner.

Figure 3:
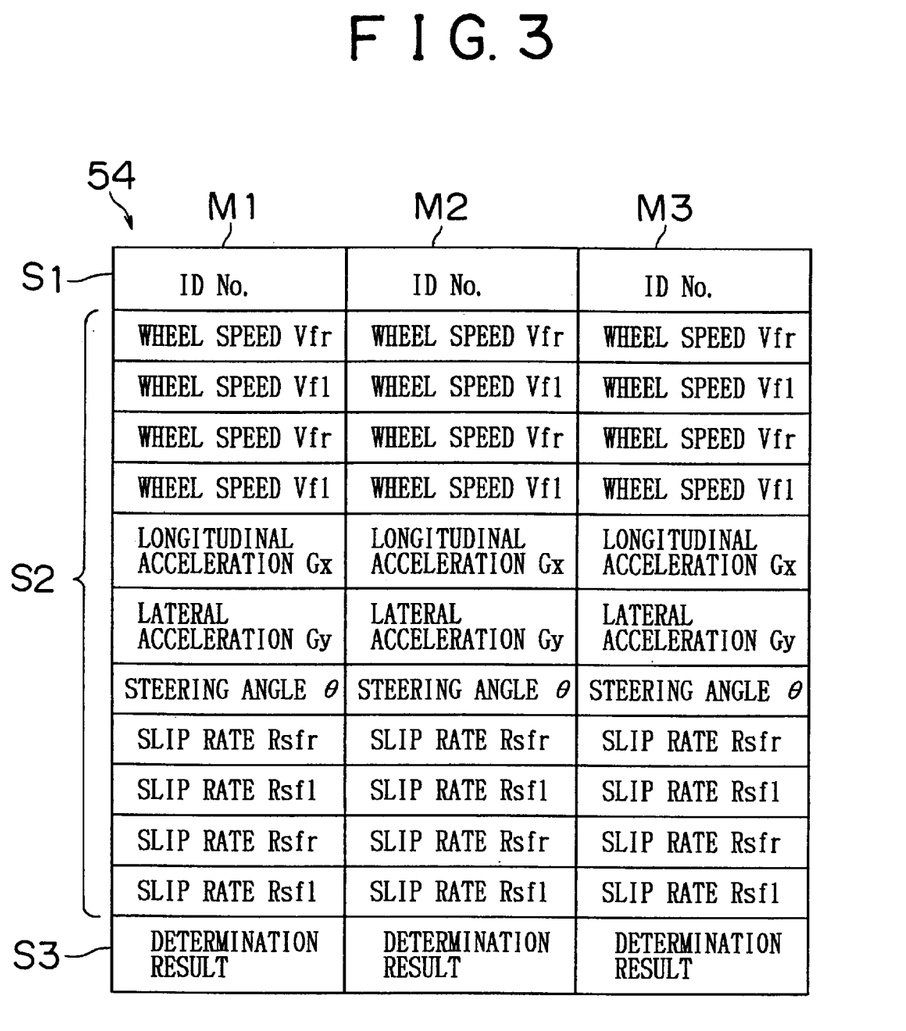
FIG. 3 illustrates storage areas of an EEPROM of the running data recording apparatus.

In the embodiment illustrated, the EEPROM 54 has three storage areas M1, M2, M3 as shown in FIG. 3. Each storage area has a section S1 for storing ID numbers as identification information regarding the recording timing, a section S2 for storing running data including the wheel speeds Vfr, Vfl, Vrr, Vrl, the longitudinal acceleration Gx, the lateral acceleration Gy, the steering angle θ, the braking slip rates Rsfr, Rsfl, Rsrr, Rsrl of the front right wheel, the front left wheel, the rear right wheel, and the rear left wheel, and a section S3 for storing results of the determination as to whether the vehicle has entered the abnormal state.

The ID numbers are set by, for example, using numbers 0 to 9. Corresponding to the data recording sequence, 0 to 9 are assigned as the ID numbers. After assignment of 9, 0 is assigned again as the next ID number. Thus, numbers 0 to 9 are sequentially used in cycle to set ID numbers. The storage areas are used for recording data in the order of the storage areas M1, M2, M3, M1, M2, . . . , repeatedly in the overwrite manner. Therefore, the ID numbers recorded in the sections S1 of the storage areas M1–M3 indicate which of the areas has the most recent or the oldest data.

Although not illustrated in detail, the motion control unit 24 also includes a general purpose microcomputer having a CPU, a ROM, a RAM, and an input-output port device that are interconnected by a bidirectional common bus.

A vehicle running data recording control in the illustrated embodiment will be described with the flowchart shown in FIG. 4. The control illustrated by the flowchart of FIG. 4 is started upon the closure of an ignition switch (not shown), and is repeatedly performed at predetermined time intervals.

Figure 4:
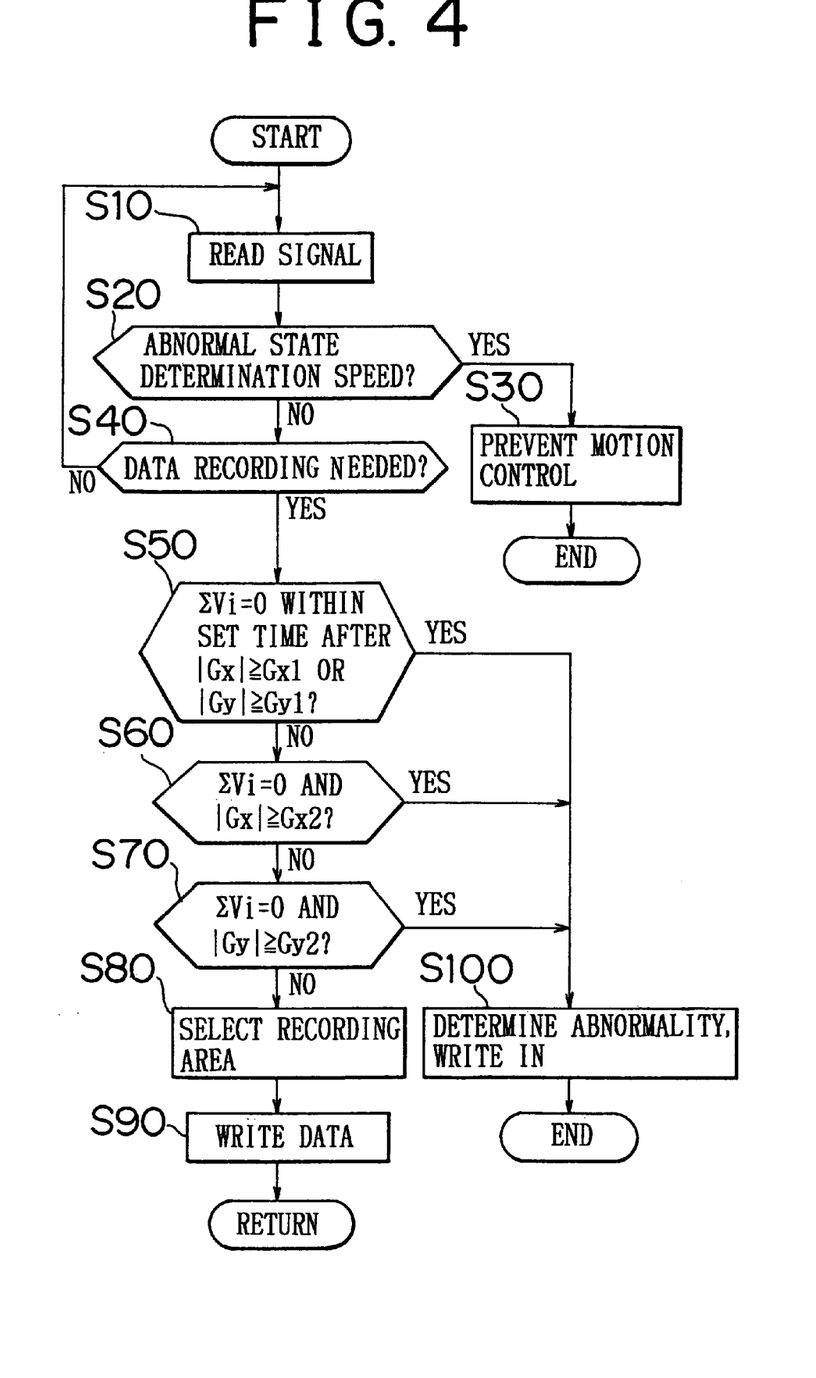
FIG. 4 is a flowchart illustrating a running data recording control routine.

In step S10 in FIG. 4, the running data recording control unit 40 reads the signals indicating the wheel speeds Vi detected by the wheel speed sensors 28FR–28RL, and the like, via the motion control unit 24, and also reads from the motion control unit 24 a signal indicating whether the anti-skid control, that is, a motion control, is being performed. Alternatively, the signals indicating the values detected by the sensors may be read directly from the sensors by the running data recording control unit 40.

Subsequently in step S20, the running data recording control unit 40 determines whether the section S3 of any storage area stores information indicating that the vehicle has entered the abnormal state. If the determination is affirmative, the process proceeds to step S30, in which the running data recording control unit 40 outputs to the motion control unit 24 a signal indicating that the motion control is to be prevented. Subsequently, the running data recording control ends. If the determination in step S20 is negative, the process proceeds to step S40.

In step S40, it is determined whether the recording of vehicle running data is needed. If the determination is negative, the process returns to step S10. If the determination is affirmative, the process proceeds to step S50.

The determination as to whether the recording of vehicle running data is needed is performed, for example, on the basis of whether the absolute value of the lateral acceleration Gy of the vehicle is equal to or greater than a reference value Gyo (positive constant) and whether the motion control unit 24 is performing a motion control (the anti-skid control or any other motion control). It may be determined that the recording of running data is needed, when it is determined that the absolute value of the lateral acceleration Gy is equal to or greater than the reference value Gyo or that the motion control unit 24 is performing the motion control.

Subsequently in step S50, a sum ΣVi of the wheel speeds Vi of the wheels is calculated. Furthermore, it is determined whether the wheel speed sum ΣVi has become zero within a predetermined length of time Tc (positive constant) following a time point at which the absolute value of the longitudinal acceleration Gx becomes equal to or greater than a reference value Gx1 (positive constant) or a time point at which the absolute value of the lateral acceleration Gy becomes equal to or greater than a reference value Gy1 (positive constant) . That is, it is determined whether the vehicle is stopped after the magnitude of the longitudinal or lateral acceleration of the vehicle has become very high. If the determination is affirmative, the process proceeds to step S100. If the determination is negative, the process proceeds to step S60.

The reference values Gx1, Gy1 used for the determination in step S50 are set to relatively large values that are not reached during normal running of the vehicle (including normal acceleration or deceleration, slope running, and the like).

In step S60, it is determined whether the sum ΣVi of the wheel speeds Vi of the wheels is zero and the absolute value of the longitudinal acceleration Gx of the vehicle is equal to or greater than a reference value Gx2 (positive constant), that is, whether the vehicle is in a stopped state and the magnitude of the detected longitudinal acceleration of the vehicle has a very high value. If the determination is affirmative, the process proceeds to step S100. If the determination in step S60 is negative, the process proceeds to step S70.

In step S70, it is determined whether the sum ΣVi of the wheel speeds Vi of the wheels is zero and the absolute value of the lateral acceleration Gy of the vehicle is equal to or greater than a reference value Gy2 (positive constant), that is, whether the vehicle is in a stopped state and the magnitude of the detected lateral acceleration of the vehicle has a very high value. If the determination is affirmative, the process proceeds to step S100. If the determination in step S70 is negative, the process proceeds to step S80.

The reference values Gx2, Gy2 used for the determinations in steps S60 and S70 are set to relatively great values that are not reached when the vehicle is in a normal stopped state (including a stop on a slope and the like).

In step S80, of the storage areas M1–M3 of the ROM 44, the storage area storing the oldest data is selected as a recording area for recording the present data. Subsequently in step S90, the vehicle running data read during the present cycle are written over the old data in the recording area selected in step S80. After that, the process returns to step S10.

In step S100, it is determined that the vehicle is in the abnormal state, for example, a crash state. Of the storage areas M1–M3, the storage area storing the previous running data is selected as a recording area. Then, information indicating that the vehicle is in the abnormal state, such as the crash state or the like, is written into the section S3 of the selected recording area. After that, the process returns to step S10.

As is apparent from the above description, the illustrated embodiment determines in step S20 whether the vehicle is in the abnormal state such as a post-accident state. If the vehicle is in the abnormal state, the determination in step S20 becomes affirmative. Then, in step S30, the embodiment prohibits or prevents the motion control unit 24 from performing the motion control. Therefore, the embodiment is able to reliably prevent an inappropriate motion control based on abnormal quantities of states detected through the sensors being in the abnormal state.

When the vehicle is in a normal state, the determination in step S20 becomes negative and, therefore, it is determined in step S40 whether the recording of vehicle running data is needed. If the vehicle is in a normal running state, the determination in step S40 becomes negative and, therefore, the recording of running data is not performed. However, if the magnitude of lateral acceleration of the vehicle has a very high value, the determination in step S40 becomes affirmative. In that case, the recording of running data is performed in steps S80 and S90 unless it is determined in step S50, S60 or S70 that the vehicle is in the abnormal state.

In contrast, when the vehicle is in the abnormal state, affirmative determination is made in any one of steps S50–S70. In that case, it is determined that the vehicle is in the abnormal state, and such information is recorded in step S100. Therefore, the recording of running data into the EEPROM 54 in the overwrite manner is prevented.

That is, when the vehicle enters the abnormal state due to a collision or the like, no further running data is recorded, and the running data stored in the EEPROM 54 up to that moment is retained. Therefore, the running data provided immediately before the vehicle enters the abnormal state can be reliably retained.

In the embodiment illustrated in the drawings, in particular, it is determined in steps S50–S70 whether the vehicle is in the abnormal state. In step S50, it is determined whether the vehicle has entered the stopped state within the predetermined length of time Tc following the time point at which the absolute value of the longitudinal acceleration Gx becomes equal to or greater than the reference value Gx1 or the time point at which the absolute value of the lateral acceleration Gy becomes equal to or greater than the reference value Gy1. Therefore, the embodiment is able to reliably determine whether the vehicle is in the abnormal state, such as a state assumed when the vehicle stops after a great increase in the magnitude of vehicle acceleration caused by a crash or the like.

Still further, the embodiment determines in step S60 whether the vehicle is in the stopped state and the absolute value of the longitudinal acceleration Gx of the vehicle is equal to or greater than the reference value Gx2. In step S70, the embodiment determines whether the vehicle is in the stopped state and the absolute value of the lateral acceleration Gy of the vehicle is equal to or greater than the reference value Gy2. Therefore, the embodiment is able to reliably determine whether the state of the mount of the forward-and-rearward acceleration sensor 30 or of the lateral acceleration sensor 32 has become abnormal due to a crash of the vehicle or the like, or whether the vehicle body is abnormally tilted.

While the present invention has been described in detail with reference to a specific embodiment, it should be apparent to those skilled in the art that the invention is not limited to the above-described embodiment but may be embodied in various other manners within the scope of the invention.

For example, although the foregoing embodiment determines in step S50 whether the vehicle has entered the stopped state within the predetermined length of time Tc following the time point at which the absolute value of the longitudinal acceleration Gx becomes equal to or greater than the reference value Gx1 or the time point at which the absolute value of the lateral acceleration Gy becomes equal to or greater than the reference value Gy1, it is also possible to calculate an acceleration Gxy of the vehicle as a square root of the sum of the square of the longitudinal acceleration Gx and the square of the lateral acceleration Gy $((Gx^2+Gy^2)^{1/2})$ and to determine whether the vehicle has entered the stopped state within the predetermined length of time Tc following a time point at which the absolute value of the acceleration Gxy of the vehicle becomes equal to or greater than a reference value Gxy1 (positive constant).

Similarly, although the foregoing embodiment determines in steps S60 and S70 whether the vehicle is in the stopped state and the absolute value of the longitudinal acceleration Gx of the vehicle is equal to or greater than the reference value Gx2 and whether the vehicle is in the stopped state and the absolute value of the lateral acceleration Gy of the vehicle is equal to or greater than the reference value Gy2, it is also possible to determine whether the vehicle is in the stopped state and the absolute value of the acceleration Gxy of the vehicle is equal to or greater than a reference value Gxy2 (positive constant).

Furthermore, although the foregoing embodiment determines whether the vehicle speed is zero and the vehicle is in the stopped state on the basis of whether the sum ΣVi of the wheel speeds Vi of the wheels is zero, it is also possible to determine whether the vehicle is in the stopped state on the basis of whether the sum ΣVi of the wheel speeds Vi is equal to or less than a reference value Vo (a positive constant close to zero) or whether the maximum value of the wheel speeds Vi of the wheels is equal to or less than a reference value Vwo (a positive constant close to zero).

Still further, although in the foregoing embodiment, the EEPROM 54 has three storage areas M1–M3 and the ID numbers are set by numbers 0 to 9, the number of storage areas and the numbers used for the ID numbers may be any suitable numbers. The vehicle running data stored in the EEPROM 54 may also be any suitable data.

In the illustrated embodiment, the running data recording controller (control unit 40) is implemented as a programmed general purpose computer. It will be appreciated by those skilled in the art that the controller can be implemented using a single special purpose integrated circuit (e.g., ASIC) having a main or central processor section for overall, system-level control, and separate sections dedicated to performing various different specific computations, functions and other processes under control of the central processor section. The controller also can be a plurality of separate dedicated or programmable integrated or other electronic circuits or devices (e.g., hardwired electronic or logic circuits such as discrete element circuits, or programmable logic devices such as PLDs, PLAs, PALs or the like). The controller can be implemented using a suitably programmed general purpose computer, e.g., a microprocessor, microcontroller or other processor device (CPU or MPU), either alone or in conjunction with one or more peripheral (e.g., integrated circuit) data and signal processing devices. In general, any device or assembly of devices on which a finite state machine capable of implementing the flowcharts shown in FIG. 4 can be used as the controller. A distributed processing architecture can be used for maximum data/signal processing capability and speed.

While the invention has been described with reference to a preferred embodiment thereof, it is to be understood that the invention is not limited to the disclosed embodiment or constructions. On the contrary, the invention is intended to cover various modifications and equivalent arrangements. In addition, while the various elements of the invention are shown in various combinations and configurations, which are exemplary, other combinations and configurations, including more, less or only a single element, are also within the spirit and scope of the invention.

What is claimed is:

1. A vehicular data recording apparatus comprising:
   a memory that records running data regarding a vehicle; and
   a controller that:
   determines whether a magnitude of an acceleration of the vehicle is equal to or greater than a reference acceleration value;
   determines whether a vehicle speed of the vehicle is equal to or less than a reference speed value;
   determines whether the vehicle is in an abnormal state based on a result of the determinations regarding the acceleration and speed of the vehicle; and
   controls the recording of the running data by the memory based on whether the vehicle is determined to be in the abnormal state.

2. A vehicular data recording apparatus according to claim 1, wherein the controller determines that the vehicle is in the abnormal state if the vehicle speed is determined to be equal to or less than the reference speed value within a predetermined length of time following a time point at which the acceleration is determined to be equal to or greater than the reference acceleration value.

3. A vehicular data recording apparatus according to claim 2, wherein the controller determines whether a magnitude of a longitudinal acceleration of the vehicle is equal to or greater than a reference longitudinal acceleration value, and determines whether a magnitude of a lateral acceleration of the vehicle is equal to or greater than a reference lateral acceleration value; and
   the controller determines that the vehicle is in the abnormal state if the vehicle speed is determined to be equal to or less than the reference speed value within the predetermined length of time following one of a time point at which the controller determines that the magnitude of the longitudinal acceleration of the vehicle is equal to or greater than the reference longitudinal acceleration value and a time point at which the controller determines that the magnitude of the lateral acceleration of the vehicle is equal to or greater than the reference lateral acceleration value.

4. A vehicular data recording apparatus according to claim 1, wherein the controller determines that the vehicle is in the abnormal state if the controller determines that the vehicle speed is equal to or less than the reference speed value and the controller determines that the acceleration of the vehicle is equal to or greater than the reference acceleration value.

5. A vehicular data recording apparatus according to claim 4, wherein the controller determines whether a magnitude of a longitudinal acceleration of the vehicle is equal to or greater than a reference longitudinal acceleration value, and determines whether a magnitude of a lateral acceleration of the vehicle is equal to or greater than a reference lateral acceleration value; and
   the controller determines that the vehicle is in the abnormal state if the controller determines that the vehicle speed is equal to or less than the reference speed value and the controller determines that the magnitude of the longitudinal acceleration of the vehicle is equal to or greater than the reference longitudinal acceleration value, or if the controller determines that the vehicle speed is equal to or less than the reference speed value and the controller determines that the magnitude of the lateral acceleration of the vehicle is equal to or greater than the reference lateral acceleration value.

6. A vehicular data recording apparatus according to claim 1, wherein the controller determines that the vehicle speed is equal to or less than the reference speed value when the vehicle speed is substantially zero.

7. A vehicular data recording apparatus according to claim 1, wherein the memory includes a memory controller that records the running data by writing the running data into the memory in an overwrite manner; and
   the controller prevents the memory controller from recording if the controller determines that the vehicle is in the abnormal state.

8. A vehicular data recording apparatus according to claim 7, wherein the memory includes a plurality of storage areas, and is designed so that the running data is written into a storage area that stores oldest running data in the overwrite manner.

9. A vehicular data recording apparatus according to claim 1, wherein the controller determines whether the running data regarding the vehicle is to be recorded; and the memory includes:

a memory controller that writes the running data into the memory when the controller determines that the running data is to be recorded.

10. A vehicular data recording apparatus according to claim 9, wherein the controller determines whether the running data is to be recorded at predetermined time intervals.

11. A vehicular data recording apparatus according to claim 9, wherein the vehicle includes a motion control apparatus that performs a motion control that stabilizes a motion of the vehicle during driving; and the controller determines that the running data is to be recorded when the motion control apparatus is performing the motion control.

12. A vehicular data recording apparatus according to claim 9, wherein the controller determines that the running data is to be recorded if a magnitude of a lateral acceleration of the vehicle is equal to or greater than a reference lateral acceleration value.

13. A vehicular data recording method comprising:

determining whether a magnitude of an acceleration of a vehicle is equal to or greater than a reference acceleration value;

determining whether a vehicle speed of the vehicle is equal to or less than a reference speed value;

determining whether the vehicle is in an abnormal state based on a result of the determinations regarding the acceleration and speed of the vehicle; and controlling the recording of running data regarding the vehicle into a memory based on the determination as to whether the vehicle is in the abnormal state.

14. A vehicular data recording method according to claim 13, wherein the vehicle is determined to be in the abnormal state if the vehicle speed is determined to be equal to or less than the reference speed value within a predetermined length of time following a time point at which the acceleration of the vehicle is determined to be equal to or greater than the reference acceleration value.

15. A vehicular data recording method according to claim 14, wherein the acceleration determination step determines whether a magnitude of a longitudinal acceleration of the vehicle is equal to or greater than a reference longitudinal acceleration value, and determines whether a magnitude of a lateral acceleration of the vehicle is equal to or greater than a reference lateral acceleration value; and wherein the vehicle is determined to be in the abnormal state if the vehicle speed is determined to be equal to or less than the reference speed value within the predetermined length of time following one of a time point at which the magnitude of the longitudinal acceleration of the vehicle is determined to be equal to or greater than the reference longitudinal acceleration value, and a time point at which the magnitude of the lateral acceleration of the vehicle is determined to be equal to or greater than the reference lateral acceleration value.

16. A vehicular data recording method according to claim 13, wherein the vehicle is determined to be in the abnormal state if the vehicle speed is determined to be equal to or greater than the reference speed value and the acceleration of the vehicle is determined to be equal to or greater than the reference acceleration value.

17. A vehicular data recording method according to claim 16, wherein the acceleration determination step determines whether a magnitude of a longitudinal acceleration of the vehicle is equal to or greater than a reference longitudinal acceleration value, and determines whether a magnitude of a lateral acceleration of the vehicle is equal to or greater than a reference lateral acceleration value; and wherein the vehicle is determined to be in the abnormal state if the vehicle speed is determined to be equal to or less than the reference speed value and the magnitude of the longitudinal acceleration of the vehicle is determined to be equal to or greater than the reference longitudinal acceleration value, or if the vehicle speed is determined to be equal to or less than the reference speed value and the magnitude of the lateral acceleration of the vehicle is determined to be equal to or greater than the reference lateral acceleration value.

18. A vehicular data recording method according to claim 13, wherein the vehicle speed is determined to be equal to or less than the reference speed value when the vehicle speed is substantially zero.

19. A vehicular data recording method according to claim 13, wherein the running data regarding the vehicle is recorded in the memory by writing the running data into the memory in an overwrite manner; and the controlling step includes preventing the running data from being written into the memory if the vehicle is determined to be in the abnormal state.

20. A vehicular data recording method according to claim 13, wherein the controlling step includes determining whether the running data regarding the vehicle is to be recorded in the memory; and the running data is written data into the memory if it is determined that the running data is to be recorded.

21. A vehicular data recording method according to claim 20, wherein the determination as to whether the running data is to be recorded is repeatedly made at predetermined time intervals.

22. A vehicular data recording method according to claim 20, wherein the vehicle includes a motion control apparatus that performs a motion control that stabilizes a motion of the vehicle during driving; and the running data is recorded when the motion control apparatus is performing the motion control.

23. A vehicular data recording method according to claim 20, wherein the controlling step causes the running data to be recorded in the memory if a magnitude of a lateral acceleration of the vehicle is determined to be equal to or greater than a reference lateral acceleration value.

* * * * *